H. D. Dunbar,
Piston for Steam Engines,
No. 2,029, Reissued July 18, 1865.
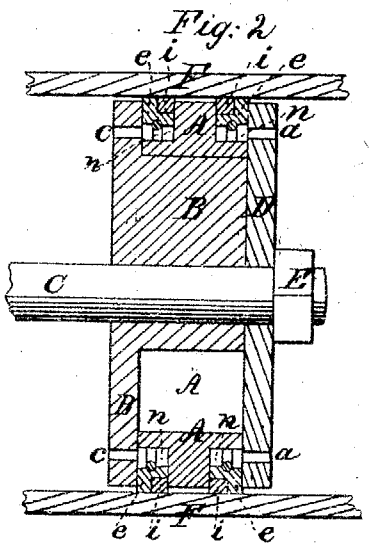
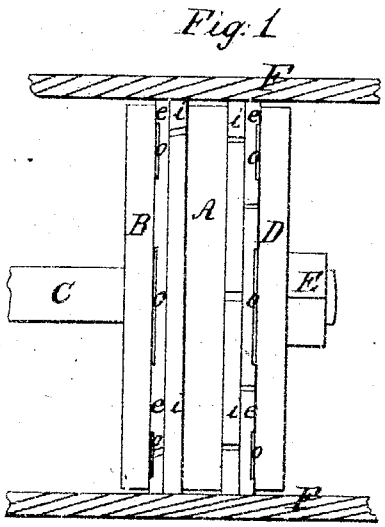
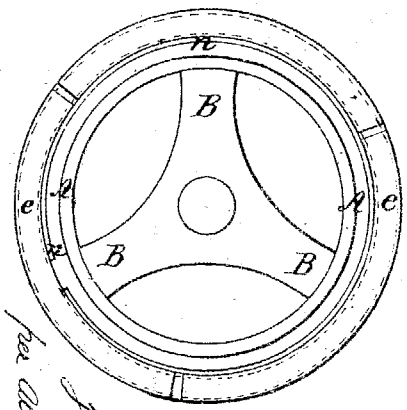
Witnesses
L. Cohen
J. Hausch
Inventor
Henry D. Dunbar
per Atty A. B. Stoughton

UNITED STATES PATENT OFFICE.

HENRY D. DUNBAR, OF SPRINGFIELD, MASSACHUSETTS.

IMPROVEMENT IN PISTONS FOR STEAM-ENGINES.

Specification forming part of Letters Patent No. 29,576, dated August 14, 1860; Reissue No. 2,029, dated July 18, 1865.

*To all whom it may concern:*

Be it known that I, HENRY D. DUNBAR, formerly of Memphis in the State of Tennessee, but now residing in Springfield, in the county of Hamden and State of Massachusetts, have invented certain new and useful Improvements in Steam-Piston Heads and their Packing; and I do hereby declare the following to be a full, clear, and exact description of the same, reference being had to the accompanying drawings, making a part of this specification, in which—

Figure 1 represents a view of the piston head and rod, and showing the cylinder in section. Fig. 2 represents a section through the cylinder and piston-head. Fig. 3 represents an end view of the piston-head with the end plate removed to show its interior.

Similar letters of reference, where they occur in the several figures, denote like parts in all the drawings.

I am aware that segmental rings have heretofore been used in connection with the packing of piston-heads; and I am also aware that packing-rings have been forced out by steam as well as by springs, and that a solid ring or head has been used in connection with packing on each side of it. I lay no claim to these things irrespective of my peculiar form and action of the solid or uncut ring, and of my sectional break-joint packing rings. No provision has heretofore been made that so effectually prevents the steam from passing through or past the packing as by my proposed plan, which is not only exceedingly cheap, simple, and efficient, but is equally applicable to piston-heads already constructed as to those about to be made.

My object is, first, to make a proper support or abutment for the packing-rings; and, secondly, to pack the piston each side of this support or abutment by segmental rings thrown out and held out by steam, but without undue friction, and without cutting the piston-head ring, by which means I make a very serviceable packing and piston, and one which in practice has been found to be economical and valuable.

My invention consists, first, in the use of a T-shaped solid or uncut ring, in connection with the "spider," hub, or central support of the piston-head, and with its end plate or plates; and, secondly, my invention consists in combining with the end plate or plates of a piston-head and a solid or uncut ring, that mutually support and abut against each other, the segmental break-joint packing-rings on each side of the solid ring, which packing-rings are forced out against the cylinder by steam admitted behind them and from their respective ends of the cylinder, as will be explained.

To enable others skilled in the art to make and use my invention, I will proceed to describe the same with reference to the drawings, which represent the packing as applied to a piston of the ordinary kind, and as already constructed. When, however, the piston-head is specially constructed with a view to the introduction of my solid or uncut ring and packing, its proportions may be varied without changing its characteristic mode of operation.

A is a solid or uncut T-shaped metallic ring, which is fitted to, and is supported by the hub or spider B, which is represented as having three arms radiating from a common center through which the piston-rod C passes, and to which the spider is secured, in any of the usual well-known ways.

D is a cap-plate that fits over the end of the piston-head, and is held thereto by the piston-rod C passing through it, and the nut E, run up against it, which draws it up closely against the flange *r* on the T-shaped solid or uncut ring A. The cap-plate D has steam-passages *a a* made through it to admit steam behind the packing-rings at that end of the piston-head. There are similar openings, *c c*, through the other end of the piston-head, to allow the steam to enter behind the packing-rings at that end. I have shown the end B, of the piston-head as cast with or made a part of the center, hub, or spider. It may be made separate therefrom, like the cap-plate D, and be drawn and held up to the center by a shoulder on the piston-rod and the screw-nut E.

The solid T-shaped ring A is laid with its flanges *r r'* upon the spider B, and the head or heads of the piston are drawn up closely against them. Its radial flange *s* projects outward so as to just move freely in the cylinder F, and leaves between itself and the end plates the recess, groove, or space into which the packing-rings *e i* are placed. Between the flanges *r r'* and the packing-rings there is a spring, *n*, to hold the rings in their proper places, and are more especially useful in a locomotive where the piston works at times, as on a descending grade, without steam. When the piston is moved by steam, then the steam holds out the packing. The ring *e* is of an L shape in its cross-section, while the other one, *i*, is square in its cross section and fits into the angle of the ring *e*, and thus break joint with each other in two directions—viz., radially and circumferentially. These rings are made in sections and separately, for convenience. Their object, however, is to break joint in two directions, where the sections meet, as above stated, and so that a square portion shall lie at the joints in the angular portion, and breaking joint with each other.

In addition to the steam-openings *a* and *c*, for allowing the steam to get in behind the packing-rings, other openings, *o o*, Fig. 1, may be used; but as a general thing those at *a c* will be found to be sufficient.

Having thus described my invention, what I claim therein as new is—

1. The solid T-shaped ring applied to a piston-head in the manner substantially as and for the purpose described.

2. In combination with a solid or uncut ring, the segmental break-joint rings *e i*, the latter fitting into the angle of the former, and both breaking joint with each other and held out against the cylinder by the action of the steam therein, substantially as described.

HENRY D. DUNBAR.

Witnesses:

A. B. STOUGHTON,

HENRY LEWIS.